United States Patent [19]

Beers

[11] 4,100,129
[45] Jul. 11, 1978

[54] CURABLE COMPOSITIONS AND PROCESS

[75] Inventor: Melvin D. Beers, Elnora, N.Y.

[73] Assignee: General Electric Company, Waterford, N.Y.

[21] Appl. No.: 579,025

[22] Filed: May 19, 1975

Related U.S. Application Data

[63] Continuation-in-part of Ser. No. 417,787, Nov. 21, 1973, abandoned.

[51] Int. Cl.$^2$ .................... C08G 77/04; C08L 43/04
[52] U.S. Cl. ............................ 260/37 SB; 260/18 S; 260/825; 528/14; 528/15; 528/16; 528/17; 528/18; 528/19; 528/34
[58] Field of Search ................ 260/46.5 E, 46.5 G, 260/18 S, 825, 37 SB

[56] References Cited

U.S. PATENT DOCUMENTS

| | | | |
|---|---|---|---|
| 3,065,194 | 11/1962 | Nitzsche et al. | 260/37 |
| 3,122,522 | 2/1964 | Brown et al. | 260/46.5 |
| 3,161,614 | 12/1964 | Brown et al. | 260/46.5 |
| 3,170,894 | 2/1965 | Brown et al. | 260/46.5 |
| 3,175,993 | 3/1965 | Weyenberg | 260/46.5 |
| 3,294,739 | 12/1966 | Weyenberg | 260/46.5 |
| 3,334,067 | 8/1967 | Weyenberg | 260/46.5 |
| 3,383,355 | 5/1968 | Cooper | 260/46.5 |
| 3,499,859 | 3/1970 | Matherly | 260/37 |
| 3,517,001 | 6/1970 | Berger | 260/248 |
| 3,542,901 | 11/1970 | Copper et al. | 260/825 |
| 3,619,255 | 11/1971 | Lengnick | 260/46.5 G |
| 3,647,725 | 3/1972 | Nitzsche | 260/18 S |
| 3,689,454 | 9/1972 | Smith et al. | 260/46.5 G |
| 3,705,120 | 12/1972 | Kawaguchi | 260/46.5 G |
| 3,719,635 | 3/1973 | Clark | 260/46.5 G |
| 3,779,986 | 12/1973 | Smith et al. | 260/46.5 G |
| 3,956,209 | 5/1976 | Hamilton | 260/18 S |
| 3,960,802 | 6/1976 | Beers et al. | 260/37 SB |

*Primary Examiner*—Paul Lieberman
*Attorney, Agent, or Firm*—E. Philip Koltos; Edward A. Hedman; Rocco S. Barrese

[57] ABSTRACT

Self-bonding, low modulus, one-package room temperature vulcanizing silicone compositions, curable in the presence of moisture, comprise (a) a silanol chain-stopped polydiorganopolysiloxane; (b) a cross-linking silane; and (c) a silanol reactive organometallic ester compound of a metal, the compound having radicals attached to the metal atom, at least one of the radicals being a substituted or unsubstituted hydrocarbonoxy radical, attachment being through M—O—C linkages, where M is the metal, and any remaining valences of M are satisfied by other organo radicals attached to M through such linkages, or an —OH, —O— or M—O—M linkage, the weight ratio of components (c) to (b) always being at least 0.5 to 1. Such compositions have unusually high adhesion to a variety of difficulty bondable substrates.

38 Claims, No Drawings

CURABLE COMPOSITIONS AND PROCESS

CROSS-REFERENCE TO RELATED APPLICATION

This application is a continuation-in-part of application Ser. No. 417,787, filed Nov. 21, 1973, now abandoned.

This invention relates to curable silicone rubber compositions. More particularly, it relates to self-bonding, low modulus, one-package room temperature vulcanizing (RTV) compositions of a diorganosiloxane polymer, a cross-linking agent and a cross-linking catalyst.

BACKGROUND OF THE INVENTION

Nitzsche and Wick, U.S. Pat. No. 3,065,194 disclose a family of silicone rubber compositions comprising an essentially anhydrous mixture of (1) a linear organosiloxane polymer having hydroxyl terminal groups, (2) a polyfunctional organosilicon cross-linking agent, and (3) a metal salt, chelate, organometallic compound, acid or base, which serves as a cross-linking catalyst. Such compositions vulcanize or cure to rubbery solids when exposed to moisture and this makes them uniquely useful, in that they can be maintained over a long period of time in a single container, e.g., sealed in caulking tubes, ready for use, but then the user can apply the material and bring it into contact with water or water vapor to cure it. Such compositions are useful in sealants, electrical insulation, coatings, dental cement, caulking compounds, expansion joints, gaskets, shock absorbers, adhesives, and in many other forms. In general, the Nitzsche et al patent states that the compositions can contain 100 parts of siloxane polymer, 0.1 to 50 parts of cross-linking agent and 0.01 to 10 parts of cross-linking catalyst. The ratio of the cross-linking agent to the cross-linking catalyst is not specified, but in the working examples, which involve silanes as the cross-linking agents and metal salts as catalysts, the ratios vary from less than unity to greater than unity.

Additional background teachings relating to one-package room temperature vulcanizing silicone compositions are to be found in Brown et al, U.S. Pat. No. 3,161,614, who show a pre-reacted silanol end-stopped diorganopolysiloxane and cross-linker, in combination with a cross-linking catalyst; Cooper, U.S. Pat. No. 3,383,355, who deals with the preparation of an alkoxy-terminated linear siloxane polymer using a neutral, finely divided solid catalyst, e.g., fuller's earth; Matherly, U.S. Pat. No. 3,499,859, who uses a hydrocarbonoxy end-blocked diorganopolysiloxane and a metal-containing curing catalyst along with boron nitride; and Cooper et al., U.S. Pat. No. 3,542,901, who use a mixture of a linear siloxane having di- or tri-functional end-blocking units with a linear siloxane having chemically non-functional inert end-blocking units on one end and di- or tri-functional end-blocking units on the other, and include a catalyst and a cross-linker. Also of interest are Brown et al., U.S. Pat. No. 3,122,522, who combine organopolysiloxane intermediates containing condensable cellosolvoxyl groups with a catalyst; Brown et al, U.S. Pat. No. 3,170,894, who combine organopolysiloxane intermediates containing condensable polyhydrocarbonoxy type radicals with a catalyst; and Weyenberg, U.S. Pat. No. 3,175,993, who combines organopolysiloxane intermediates end-blocked with alkoxylated silcarbane groups with a catalyst.

Smith and Hamilton, U.S. Pat. No. 3,689,454 and U.S. Pat. No. 3,779,986, Weyenberg, U.S. Pat. No. 3,294,739 and 3,334,067, and Clark et al., U.S. Pat. No. 3,719,635 provide one-package compositions with the same advantages as those of Nitzsche et al, but, because the former use a titanium ester catalyst instead of the metal salts of Nitzsche et al., it is easier to control gelation and the undesired build-up in viscosity during mixing and the compositions can be stored for longer periods of time, before use. Although these citations disclose use of cross-linkers and titanium ester catalysts over a broad range of compositions, the ratios between these components are not particularly specified, and in all of the working examples, the ratio of cross-linker to catalyst is always in excess of 2. Moreover, both Smith and Hamilton and Weyenberg state a preference for the presence of an amount of silane in excess of the silicon bonded hydroxyl — to protect the system from gelation — and the amount of catalyst in their work is always selected to be less than one-half of the amount of cross-linker used.

Although a wide choice of components is thus seen to be useful for the preparation of one-package RTV compositions, there has not been too much appreciation by those skilled in the art of the factors involved in securing specified properties in the cured silicone rubber. It is known, for example, that some variations in properties can be induced in the cured composition by varying the molecular weight of the silanol chain-stopped polydiorganopolysiloxane. For example, as the molecular weight is increased, elongation of the rubber increases. On the other hand, if a lower viscosity material is used, the cure is tighter so that the cured material has a lower elongation and increased hardness. The adhesion of the cured composition to a variety of conventional substrates is also a factor which can be predictably influenced and this generally has involved incorporating a monofunctional silane chain-terminating agent in combination with the cross-linker, or in extreme cases, by adding an adhesion promoter. In any event, both modulus control and adhesion control are not easily achieved and still leave a lot to be desired in the present state of the art.

It has now been discovered that if the conventional ingredients are used, but at properly selected and novel ratios, self-bonding, low modulus, one-package room temperature vulcanizing silicone rubber compositions can be obtained with a very advantageous tensile and elongation relationship, i.e., low tensile and exceptionally high elongation. Moreover, compositions are provided which give self-bonding adhesion properties to many ordinarily troublesome substrates, with less need to use adhesion promoters or even permitting them to be eliminated from the composition.

These results are unexpected, because the present compositions use the catalyst and the cross-linker in a ratio of at least 0.5 to 1 (instead of less than 0.5 to 1, i.e., more than a 2-fold excess of the cross-linker as in the prior art) and, in the most preferred compositions, the ratio of catalyst to cross-linker will always be at least unity. In preferred cases, the silane cross-linker will be used in amounts less than that previously thought necessary to cover all of the silanol groups in the base product and prevent gelation. If the metal ester catalyst is present in an amount greater than one-half the weight of the silane, no such gelation has been seen to occur.

DESCRIPTION OF THE INVENTION

According to the invention, there are provided fluid compositions stable under substantially anhydrous conditions and curable to a self-bonding elastic solid in the presence of moisture which comprise:

(a) 100 parts by weight of a silanol chain-stopped polydiorganosiloxane of the formula:

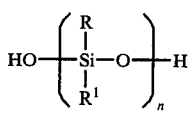

wherein R and $R^1$ are each, independently, organic radicals of up to 8 carbon atoms selected from hydrocarbyl, halohydrocarbyl and cyano lower alkyl and $n$ is an average number of from about 10 to 15,000;

(b) from 0.01 to 5.0, preferably, 0.1 to 0.95 parts by weight of a cross-linking silane of the formula:

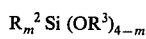

wherein $R^2$ and $R^3$ have the values defined for R and $R^1$ hereinabove and $m$ has a value of 0 to 3 and an average value based on the total amount of silane in the composition of 0 to 1.99; and (c) from 0.1 to 10 parts by weight of a silanol reactive organometallic ester compound of a metal the compound having radicals attached to the metal atom, at least one of said radicals being a hydrocarbonoxy radical or a substituted hydrocarbonoxy radical, said radicals being attached to the metal atoms through M—O—M linkages wherein M is the metal and any remaining valences of the metal are satisfied by substituents selected from organic radicals which are attached to the metal atom through M—O—C linkages, —OH and —O— of a M—O—M linkage, the weight ratio of components (c) to (b) always being greater than 0.5 to 1 and preferably, greater than unity.

According to another preferred aspect of this invention, there is provided a method of preparing a rubbery material which comprises preparing a composition as above defined under substantially anhydrous conditions and thereafter exposing the composition to moisture until it cures to a rubbery material.

The RTV compositions of the present invention are prepared by simply admixing one or more of the silanol chain-stopped polyorganosiloxanes of the above formula, having an average of at least about 2.01 silicon-bonded alkoxy radicals per silicon atom and the cross-linking silane compound and the silanol reactive organometallic ester. The components are preferably at room temperature during mixing. Since the silanes tend to hydrolyze upon contact with moisture, care should be exercised to exclude moisture during the addition of the silane to the silanol chain-stopped polydiorganopolysiloxane. Likewise, care should be taken that the mixture of the silane, the silanol reactive organometallic ester and the silanol chain-stopped polydiorganosiloxane is maintained under substantially anhydrous conditions if it is desired to store the admixture for an extended period of time prior to conversion of the composition to the cured, solid, elastic silicone rubber state. On the other hand, if it is desired to permit the mixture to cure immediately, then no special precautions are necessary and the three components can be mixed and placed in the form or shape in which it is desired for the composition to be cured.

The amount of the silane cross-linker component to be mixed with the silanol chain-stopped polydiorganosiloxane can vary within wide limits. However, for best results, it is preferred to add less than one mole of the silane per mole of silanol groups in the silanol chain-stopped polydiorganosiloxane component (a).

Moreover, it is preferred to employ an amount of organometallic ester which provides a total number of moles of silanol reactive ester linkages which is equal to or greater than the total number of moles of terminal silanol groups in the polydiorganosiloxane component (a).

While not intending to be bound by any theory of operation, it is believed that such ratios operate to promote the formation of a silicone base polymer which is completely or partially terminated with organometallic ester linkages, which are silanol reactive and form hydrolytically unstable —Si—O—M bonds in combination with just enough silicone cross-linker functionally to yield the unusual combination of tensile and elongation and the superior adhesion observed in the cured products.

Within the above framework, in the most preferred compositions, the weight ratio of components (c) to (b) will be from 1 to 50, and especially preferably, from 1 to 10. Special mention is made of weight ratios for (c) to (b) of from 1 to 5.

Formation of the composition can be carried out by mixing the ingredients alone or with conventional fillers, additives, and the like. In certain cases, an inert solvent can be used, i.e., one which will not react with the silanol or alkoxy groups on the silicon. Suitable solvents include hydrocarbons, such as benzene, toluene, xylene, or petroleum ethers; halogenated solvents such as perchloroethylene or chlorobenzene and organic ethers such as diethylether and dibutylether; ketones such as methylisobutylketone and fluid hydroxyl-free polysiloxanes. The presence of a solvent is particularly advantageous when the silanol chain-stopped polydiorganosiloxane component (a) is a high molecular weight gum. The solvent reduces the overall viscosity of the composition and facilitates cure. The RTV compositions may be kept in the solvent until they are to be used. This is particularly valuable when a gummy composition is to be employed in coating applications.

So long as the specified ratios of ingredients are employed, a wide choice of components is available from which to prepare the compositions of this invention. These are described in many places, such as Smith and Hamilton, U.S. Pat. Nos. 3,779,986; 3,065,194; 3,294,739; 3,334,067 and 3,708,467, the disclosures of which are incorporated herein by reference.

With respect to the silanol chain-stopped polyorganosiloxane component (a), these can be selected from those represented by the formula:

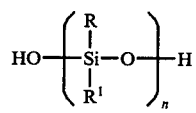

wherein R and $R^1$ are each organic radicals of up to 20, and preferably, up to 8, carbon atoms selected from hydrocarbyl, halohydrocarbyl and cyano lower alkyl, and $n$ is a number that varies generally from about 10 to 15,000, preferably, from 300 to about 5,200, and, more preferably, from 370 to 1,350.

The silanol chain-stopped polydiorganosiloxanes are well known in the art and include compositions containing different R and $R^1$ groups. For example, the R groups can be methyl, while the $R^1$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units and methylphenylsiloxane units or, for example, copolymers of dimethylsiloxane units, methylphenylsiloxane units and methylvinylsiloxane units. Preferably, at least 50% of the R and $R^1$ groups of the silanol chain-stopped polydiorganosiloxanes are alkyl, e.g., methyl groups.

In the above formula, R and $R^1$ can be, for example, mononuclear aryl, such as phenyl, benzyl, tolyl, xylyl and ethylphenyl; halogen-substituted mononuclear aryl, such as 2,6-dichlorophenyl, 4-bromophenyl, 2,5-difluorophenyl, 2,4,6-trichlorophenyl and 2,5-dibromophenyl; alkyl such as methyl, ethyl, n-propyl, isopropyl, n-butyl, sec-butyl, isobutyl, terbutyl, amyl, hexyl, heptyl, octyl; alkenyl such as vinyl, allyl, n-butenyl-1, n-butenyl-2, n-pentenyl-2, n-hexenyl-2,2,3-dimethylbutenyl-2, n-heptenyl; alkynyl such as propargyl, 2-butynyl; haloalkyl such as chloromethyl, iodomethyl, bromomethyl, fluoromethyl, chloroethyl, iodoethyl, bromoethyl, fluoroethyl, trichloromethyl, diiodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobbutyl, 1,3,3-tribromobutyl, chloropentyl, bromopentyl, 2,3-dichloropentyl, 3,3-dibromopentyl, chlorohexyl, bromohexyl, 1,4-dichlorohexyl, 3,3-dibromohexyl, bromooctyl; haloalkenyl such as chlorovinyl, bromovinyl, chloroallyl, bromoallyl, 3-chloro-n-butenyl-1, 3-chloro-n-pentyl-1, 3-fluoro-n-heptenyl-1, 1,3,3-trichloro-n-heptenyl-5, 1,3,5-tri-chloro-n-octenyl-6, 2,3,3-trichloromethylpentenyl-4; haloalkynyl such as chloropropargyl, bromopropargyl cycloalkyl, cycloalkenyl and alkyl and halogen substituted cycloalkyl and cycloalkenyl such as cyclopentyl, cyclohexyl, cycloheptyl, cyclooctyl, 6-methylcyclohexyl, 3,3-dichlorocyclohexyl, 2,6-dibromocycloheptyl, 1-cyclopentenyl, 3-methyl-1-cyclopentenyl, 3,4-dimethyl-1-cyclopentenyl, 5-methyl-5-cyclopentenyl, 3,4-dichloro-5-cyclopentenyl, 5-(ter-butyl)1-cyclopentenyl, 1-cyclohexenyl, 3-methyl-1-cyclohexenyl, 3-4-dimethyl-1-cyclohexenyl; and cyano lower alkyl such as cyanomethyl, beta-cyanoethyl, gamma-cyanopropyl, deltcyanobutyl, and gamma-cyanoisobutyl.

A mixture of various silanol chain-stopped polydiorganosiloxanes also may be employed. The silanol chain-stopped materials useful in the RTV compositions of this invention have been described as polydiorganosiloxanes but such materials can also contain minor amounts, e.g., up to about 20% of monoorganosiloxane units such as monoalkylsiloxane units, e.g., monomethylsiloxane units and monophenylsiloxane units. See, for example, Beers, U.S. Pat. Nos. 3,382,205 and 3,438,930, which are incorporated herein by reference.

The silanol chain-stopped polydiorganosiloxanes employed in the practice of the present invention may vary from low viscosity thin fluids to viscous gums, depending upon the value of $n$ and the nature of the particular organic groups represented by R and $R^1$.

The viscosity of component (a) can vary broadly, e.g., in the range of 30 to 10,000,000 cps. at 25° C. Preferably, it will be in the range of 2,000 to 1,000,000, and most preferably, from about 20,000 to 200,000 cps. at 25° C.

The silane cross-linking agent (b) of the formula:

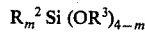
$$R_m^2 Si (OR^3)_{4-m}$$

is one which has values for $R^2$ and $R^3$ which are the same as those defined for R and $R^1$ above.

Illustrative of such silanes useful in the RTV compositions of this invention are the following:

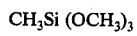
$CH_3Si(OCH_3)_3$

$CH_3Si(OCH_2CH_3)_3$

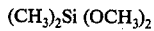
$(CH_3)_2Si(OCH_3)_2$

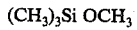
$(CH_3)_3Si OCH_3$

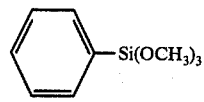

$Si(OCH_3)_4$

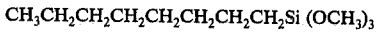
$CH_3CH_2CH_2CH_2CH_2CH_2CH_2CH_2Si(OCH_3)_3$

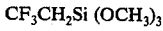
$CF_3CH_2Si(OCH_3)_3$

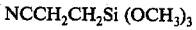
$NCCH_2CH_2Si(OCH_3)_3$

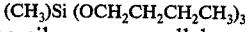
$(CH_3)Si(OCH_2CH_2CH_2CH_3)_3$

The silanes are well known in the art and are described, for example, in Berridge, U.S. Pat. No. 2,843,555.

When the silane is employed as a cross-linking agent, $m$ has a value of 1 and the preferred silane is $CH_3Si(OCH_3)_3$. When it is desired to have a chain-extending agent employed in combination with the cross-linking agent, $m$ has a value of 2 resulting in the silane being difunctional. The preferred difunctional silane is $(CH_3)_2Si(OCH_3)_2$. The presence of a chain-extending agent results in a final cured product having a higher degree of elasticity. The same result would be obtained if a higher molecular weight silanol end-stopped fluid were used. Then, however, the curable composition also has a higher viscosity and is very difficult to handle.

The modulus of elasticity can be improved still more by using a silane of the above formula wherein $m$ has a value of 3. The preferred silane for this purpose is $(CH3)_3SiOCH_3$. The use of such monofunctional silane chain-terminating unit in combination with the cross-linking and optional chain-extending silanes discussed above, not only results in a higher modulus of elasticity but in many instances also provides a further improvement in adhesion of the cured compositions to a substrate.

The preferred silanes of the above formula will contain on the average of from 1.05 to 3 silicon-bonded alkoxy groups per silane when a fluid containing two silanol-containing terminal groups is employed. If the number of alkoxy groups are only two, this merely results in a build-up of chain length. Average in this situation means the total number of silicon-bonded alkoxy groups divided by the total number of silane molecules used in the RTV composition.

With respect to silanol reactive organometallic ester component (c), in general the types of metals can vary broadly, so long as silicon is not included — because of the need to provide a selectively hydrolyzable Si—O—M bond. Preferably, the metal will be selected from lead, tin, zirconium, antimony, iron, cadmium, barium, calcium, titanium, bismuth, manganese, zinc, chromium, cobalt, nickel, aluminum, gallium or germanium. Most preferably, the metal is titanium. The organometallic compound is preferably an orthoester of a lower aliphatic alcohol, a partially chelated ester of a lower aliphatic alcohol with a β-dicarbonyl compound or a partial hydrolyzate of such compounds which retain at least one hydrocarbonoxy radical or substituted hydrocarbonoxy radical attached to the metal atom through M—O—C linkages.

Especially important are partially chelated organometalic esters and particularly titanium compounds of the formula:

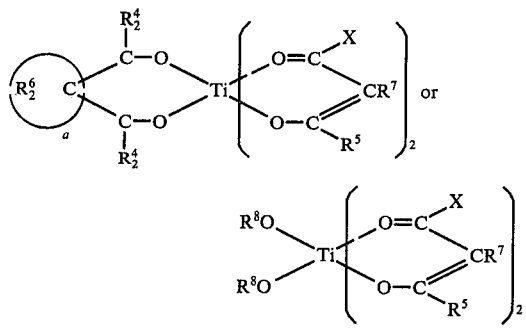

wherein $R^4$ is hydrogen, or an organic radical of up to 8 carbon atoms selected from hydrocarbyl, halohydrocarbyl, or carboxyalkyl; $R^5$ is a radical of up to 8 carbon atoms selected from hydrocarbyl, halohydrocarbyl and cyano-lower alkyl; $R^6$ is selected from same group as $R^4$ and in addition, from halo, cyano, nitro, carboxy ester, or acyl and hydrocarbyl substituted by halo, cyano, nitro, carboxy ester and acyl, the total number of carbon atoms in the $R^4$ and in the $R^6$ substituted alkanedioxy radical being not more than about 18; $R^7$ is selected from hydrogen or an organic radical of up to 8 carbon atoms selected from hydrocarbyl, halohydrocarbyl, or acyl and, when taken together with $R^5$ forms together with the carbon atoms to which they are attached a cyclic hydrocarbon substituent of up to about 12 carbon atoms or such a substituent substituted with one or more of a chloro, nitro, acyl, cyano or carboxy ester substituents; X is a radical of up to 20 carbon atoms selected from hydrocarbyl, halohydrocarbyl, cyanoalkyl, alkoxy, haloalkoxy, cyanoalkoxy, amino or ether and polyether groups of the formula $-(C_qH_{2q}O)_vR$ where $q$ is from 2 to 4, $v$ is from 1 to 20 and R is as defined above, $a$ is 0 or an integer of up to 8 and, when $a$ is 0, the $>C-R_2^4$ groups are bonded to each other in a cyclic fashion, and $R^8$ is a radical of up to 8 carbon atoms selected from hydrocarbyl, halohydrocarbyl or cyano-lower alkyl.

These are made by reacting a beta-dicarbonyl compound with a titanium compound, to form a dialkoxy titanium chelate. The dialkoxy titanium chelate can then be reacted with a corresponding alkanediol to produce a wholly cyclic-substituted chelated titanium compound. The preparation of such compounds is described in the above-mentioned U.S. Pat. Nos. 3,689,454 and 3,779,986, and in U.S. Pat. Nos. 3,334,067 and 3,708,467.

Illustrative of such compounds are:

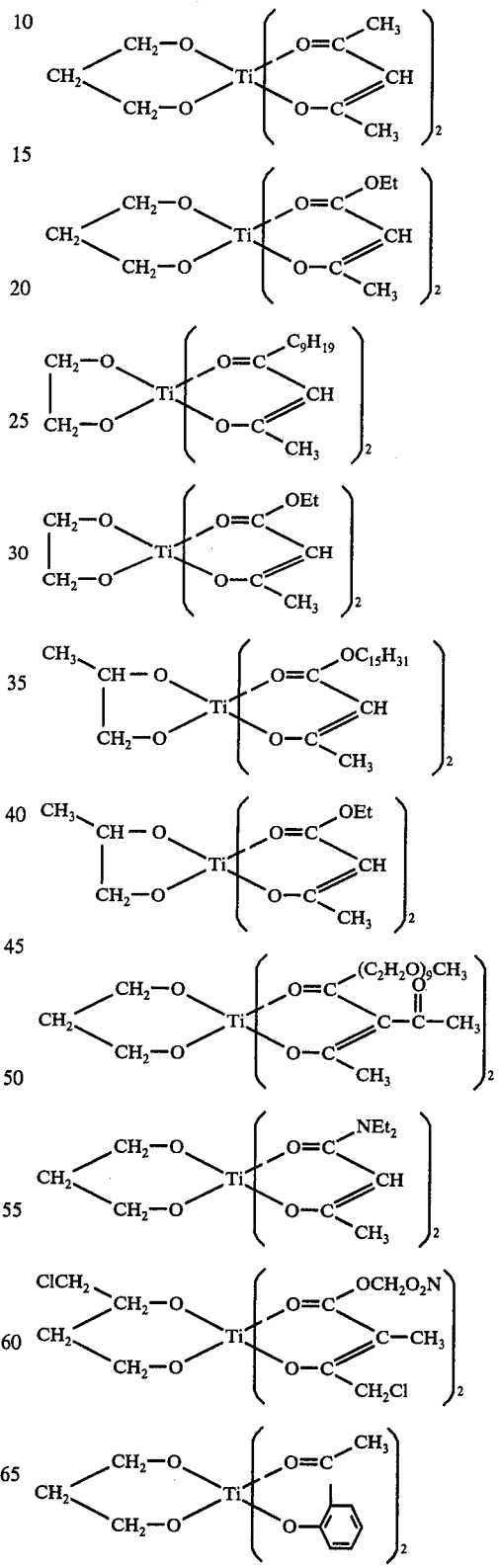

-continued

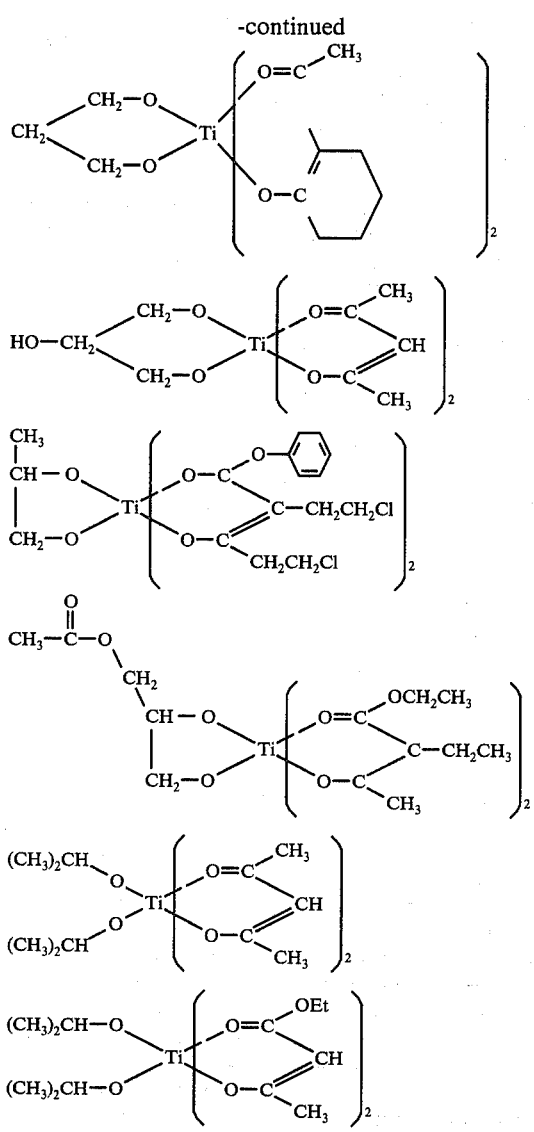

Other examples will be readily apparent from the description of substituents which may be present on the titanium. Most preferably, because of highest elongation, tensile and peel strength, component (c) will have the formula:

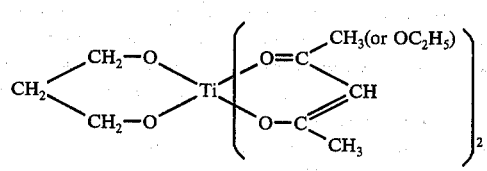

The RTV compositions of the present invention can also be modified by the incorporation of various extenders or fillers. Illustrative of the many fillers which can be employed with the compositions of the present invention are titanium dioxide, lithopone, zinc ozide, zirconium silicate, silica aerogel, iron dioxide, diatomaceous earth, calcium carbonate, fumed silica, silazane treated silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. Among the most useful fillers are calcium carbonate alone, or mixed with fumed silica. Organosilicone- or silazane- treated silica fillers, such as those described in Lucas, U.S. Pat. No. 2,938,009; Lichtenwalner, U.S. Pat. No. 3,004,859; and Smith, U.S. Pat. No. 3,635,743, are also particularly suitable for use in the RTV compositions of the present invention. The fillers are generally employed in amounts from about 5 to about 200 parts, and preferably, from 10 to about 100 parts by weight per 100 parts of silanol chain-stopped polydiorganosilozane component (a).

In addition to fillers, the present compositions can also optionally include an adhesion promoter, e.g., from 0.2 to 2 parts of such promoter per 100 parts of component (a). These will generally be nitrogen-containing compounds, e.g., acetonitrile. A preferred class of promoters is those of the formula:

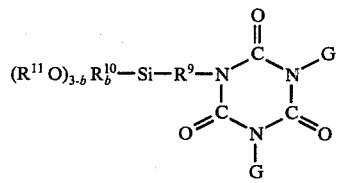

wherein G is the same as $R^{10}$, hereinafter defined, a $(R^{11}O)_{3-b}$— $R_b^{10}$—Si—$R^9$ radical, styryl, vinyl, allyl, chloroallyl or cyclohexenyl; $R^9$ is a divalent radical selected from alkylenearylene, alkylene, cycloalkenyl and halosubstituted such divalent radicals; $R^{10}$ is a radical of up to 8 carbon atoms selected from hydrocarbyl or halohydrocarbyl and $R^{11}$ is a radical of the type defined for $R^{10}$ and also cyano lower alkyl; and $b$ is 0 to 3.

Such adhesion promoters are disclosed in the copending application of Berger, Ser. No. 301,637, filed Oct. 17, 1972, now abandoned, which is incorporated herein by reference. The most preferred such promoters are 1,3,5-tris-trimethoxysilylpropylisocyanate and bis-1,3-trimethoxysilylpropylisocyanurate.

In addition to fillers and adhesion promoters, the present compositions can also include a thixotrope or viscosity depressant in the form of from 0.3 to 20 parts by weight of a low molecular weight linear polydiorganosiloxane. A preferred class of such viscosity depressants is those of the formula:

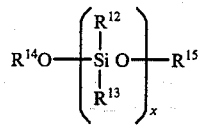

wherein $R^{12}$ and $R^{13}$ are each organic radicals of up to 8 carbon atoms selected from hydrocarbyl, halohydrocarbyl and cyano lower alkyl, $R^{14}$ and $R^{15}$ are, independently, hydrogen or radicals as defined for $R^{12}$ and $R^{13}$, and $x$ has a value of from 2 to 46.

The most preferred such thixotropes are those of the above formula wherein, in the viscosity depressant, $R^{14}$ and $R^{15}$ are methyl, $R^{12}$ and $R^{13}$ are methyl or methyl and phenyl in a ratio of about 70:30, and $x$ is an integer of from 3 to 50.

Additional conventional ingredients can also be included, such as flame retardants, stabilizing agents, pigments, reinforcements, and the like.

The compositions of this invention are stable in the absence of moisture. Consequently, they can be stored for prolonged periods of time without deleterious effect. During this period of storage, no significant change occurs in the physical properties of the room temperature vulcanizing compositions. This is especially advantageous commercially because it insures that once the composition is prepared with a given consistency and cure time, neither change significantly on storage. Storage stability is one of the characteristics which makes the present compositions valuable in one-package systems.

The compositions prepared by mixing the metal ester catalyst and the silane with the silanol chain-stopped polydiorganosiloxanes under anhydrous conditions can be used without further modification in many sealing, caulking and coating applications merely by placing the compositions in the desired location and permitting them to cure upon exposure to the moisture present in the atmosphere. Upon such exposure, even after previous storage for many months, a "skin" will form on the present compositions within a relatively short time, e.g., from ½ to about 8 hours, and they will cure to a rubbery state within from a few hours to several days, at room temperature, e.g., 18° to 25° C.

Where the compositions of the present invention contain ingredients other than the silanol-terminated polydiorganosiloxane, the silane cross-linker and the metal ester catalyst, these additional ingredients can be added in any desired manner. However, for ease in manufacturing, it is often most convenient to form a "base" blend of all of the components except the silane, the metal ester and, if present, the adhesion promoter, then to remove moisture from the base blend, e.g., by maintaining it under a vacuum and thereafter to add the silane, the metal ester and, optionally, the adhesion promoter, just prior to packaging in containers protected from moisture.

The compositions of this invention are particularly suitable for caulking and sealing applications where excellent adhesion to a variety of substrates is important. For example, the compositions are useful in household and industrial caulking and sealing in buildings, factories, automobiles, and the like, and with substrates such as masonry, glass, plastic, metal, wood, and the like. There is little or no tendency for the present compositions to corrode sensitive substrates, e.g., metals, such as copper and brass. They are also advantageous in having excellent rates of application, making them readily suitable for application from conventional caulkers under standard conditions.

DESCRIPTION OF THE PREFERRED EMBODIMENTS

The following examples are illustrative only and should not be construed as limiting the invention.

EXAMPLE 1

A base compound is prepared comprising the following (by weight):

| | |
|---|---|
| 25,000 cps. viscosity, silanol terminated polydimethylsiloxane | 100 parts |
| stearic acid treated calcium carbonate (filler) | 100 parts |
| 50 cs. methoxy terminated dimethylsiloxy diphenylsiloxy copolymer fluid containing 30 mole % diphenylsiloxy groups (thixotrope) | 5 parts |

A catalyst mixture is prepared comprising the following (by weight):

| | |
|---|---|
| methyltrimethoxysilane (cross-linker) | 0.5 parts |
| 1,3-dioxypropanetitanium-bis-ethyl acetoacetate (catalyst) | 1.8 parts |
| 1,3,5-tris-trimethoxysilylpropylisocyanurate (adhesion promoter) | 0.75 parts |

One hundred parts of the base compound is mixed together with 3.05 parts of the catalyst mixture in the absence of air and atmospheric moisture and then packaged in 6 ounce polyethylene tubes. The material is allowed to stand for three days to come to chemical equilibrium. Test sheets are then prepared and allowed to cure at 77° ± 2° F and 50° ± 5% relative humidity for seven days. The following test results are obtained:

| | |
|---|---|
| Shore A hardness | 17 |
| Tensile strength, psi | 85 |
| Elongation, % | 1650 |
| Application rate, grams/minute | 170 |
| Rheological properties | self-leveling |

EXAMPLE 2

A base compound is prepared comprising the following (by weight):

| | |
|---|---|
| 25,000 cps. viscosity, silanol terminated polydimethylsiloxane | 100 parts |
| hexamethylcyclotrisiloxane treated fumed silica having a surface area of approximately 200m²/gram (filler) | 10 parts |
| stearic acid treated calcium carbonate (filler) | 125 parts |
| 50 cs. methoxy terminated dimethylsiloxy diphenylsiloxy copolymer fluid containing 30 mole % diphenylsiloxy groups | 5 parts |
| trimethylsilyl terminated 20 cs. viscosity polydimethylsiloxane fluid | 20 parts |

A catalyst mixture is prepared as described in Example 1 and 3.05 parts (by weight) are mixed with 100 parts of the base compound. After equilibration and curing as described in Example 1, a rubber having the following properties is obtained:

| | |
|---|---|
| Shore A hardness | 24 |
| Tensile, psi | 190 |
| Elongation | 990 |
| Tear, lbs./in. | 45 Knotty |
| Tack Free Time | 3.5 hours (finger) |
| Application rate, g/min. | 205 |
| Flow, in. | 0.12 |
| Tooling Time | 30 mins. |
| Specific Gravity | 1.42 |

The self-bonding adhesion properties of the composition of Example 2 are measured at a bondline thickness of ⅛ inch.

| Substrate | | Value | Cohesive Failure, % |
|---|---|---|---|
| Polycarbonate, | lbs./in. | 45 to 55 | 100 |
| Polyacrylate | " | " | " |
| PVC | " | " | " |

-continued

| Substrate | Value | Cohesive Failure, % |
|---|---|---|
| Polystyrene | " | " |
| Stainless Steel | " | " |

Underwater adhesion characteristics after 43 days are as follows:

| Substrate | Value | Cohesive Failure, % |
|---|---|---|
| Stainless Steel, lbs./in. | 50 | 100 |
| Polyacrylate | " | " |

EXAMPLE 3

A base compound is prepared comprising the following (by weight):

| | | |
|---|---|---|
| 105,000 cps. viscosity, silanol terminated polydimethylsiloxane | 100 | parts |
| octamethylcyclotetrasiloxane treated fumed silica having a surface area of approximately 200m²/gm. (filler) | 12.5 | parts |
| stearic acid treated calcium carbonate (filler) | 125 | parts |
| 50 cps. methoxy terminated dimethylsiloxy diphenylsiloxy copolymer fluid containing 30 mole % diphenyl siloxy groups | 5 | parts |
| trimethylsilyl terminated 50 cps. viscosity polydimethylsiloxane fluid | 40 | parts |

A catalyst mixture is prepared comprising the following (by weight):

| | |
|---|---|
| methyltrimethoxysilane | 1.5 parts |
| 1,3-dioxypropanetitanium-bis-ethylacetoacetate (catalyst) | 1.8 parts |
| 1,3,5-tris-trimethoxysilylpropyl-isocyanurate | 0.75 parts |

One hundred parts of the base compound is mixed together with 4.05 parts of the catalyst mixture in the absence of air and atmospheric moisture. The anhydrous material is equilibrated then cured and tested as described in Example 1. The following test results are obtained:

| | |
|---|---|
| Shore A hardness | 24 |
| Tensile strength, psi | 230 |
| Elongation, % | 840 |
| Application rate, grams/minute | 222 |
| Rheological properties | non-sagging |
| Tack Free Time | 7 hours |

This composition is especially superior in its self-bonding and adhesion properties.

EXAMPLE 4

A base compound is prepared comprising the following (by weight):

| | |
|---|---|
| 25,000 cps. viscosity, silanol terminated polydimethylsiloxane octamethylcyclotetrasiloxane-treated fumed silica filler having a surface area of approximately 200m²/gm. | 100 parts |
| stearic acid treated calcium carbonate (filler) | 85 parts |
| a silanol containing 25 cs. | |
| viscosity polymethylsiloxane fluid having approximately 5 mole % trimethylsiloxy, 20 mole % methylsiloxy, 75 mole percent dimethylsiloxy groups and 0.5 weight % silanol | 15 parts |

A catalyst solution is prepared comprising the following (by weight):

| | |
|---|---|
| methyltrimethoxysilane | 0.5 parts |
| 1,3-dioxypropanetitanium-bis-ethylacetoacetate (catalyst) | 1.8 parts |
| 1,3,5-tris-trimethoxysilylpropylisocyanurate | 0.75 parts |

One hundred parts of the base compound is mixed together with 3.05 parts of the catalyst solution in the absence of air and atmospheric moisture. The anhydrous material is allowed to stand for three days and then cured and tested as described in Example 1. The following test results are obtained:

| | |
|---|---|
| Shore A hardness | 25 |
| Tensile strength, psi | 155 |
| Elongation, % | 860 |
| Application rate, g./min. | 115 |
| Rheological properties | non-sagging |
| Tack Free Time | 3 hours |
| Peel Adhesion from stainless steel, lbs./in. | 55 |

EXAMPLE 5

The procedure of Example 1 is repeated, substituting 1,3-dioxypropanetitanium-bis-acetylacetonate for 1,3-dioxypropanetitanium-bis-ethylacetoacetate as the catalyst. Substantially the same results are obtained.

EXAMPLE 6

The procedure of Example 2 is repeated, substituting 1,3-dioxypropanetitanium-bis-acetylacetonate for 1,3-dioxypropanetitanium-bis-ethyl acetoacetate. Substantially the same results are obtained.

EXAMPLE 7

The procedure of Example 1 is repeated, substituting 1,3-dioxypropanetitanium-bis-pentadecylacetoacetate for 1,3-dioxypropanetitanium-bis-ethylacetoacetate. Substantially the same results are obtained.

EXAMPLE 8

The procedure of Example 1 is repeated, substituting a catalyst of the formula:

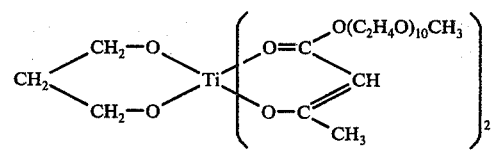

for the 1,3-dioxypropanetitanium-bis-ethylacetoacetate. Substantially the same results are obtained.

EXAMPLE 9

The procedure of Example 2 is repeated, substituting di-isopropoxytitanium-bis-ethylacetoacetate for 1,3- dioxypropanetitanium-bis-ethylacetoacetate. Low modulus properties are again obtained, however, lower elongation and substantially reduced tensile strength and peel adhesion values result.

| | |
|---|---|
| Shore A hardness | 17 |
| Tensile, psi | 43 |
| Elongation | 805 |
| Flow, in. | 0.28 |
| Peel Adhesion lbs./in. | |
| Stainless steel | 17* |
| Polyacrylate | 15* |

*100 percent cohesive failure was achieved.

The following example illustrates the use of a higher cross-linker than titanium chelate level, i.e., the ratio of (c) to (b) is 0.865.

EXAMPLE 10

A base compound is prepared comprising the following (by weight):

| | |
|---|---|
| 25,000 cps. viscosity silanol terminated polydimethylsiloxane | 100 parts |
| hexamethylcyclotrisiloxane treated fume silica filler having a surface area of approximately 200m²/g. | 13 parts |
| stearic acid treated calcium carbonate filler | 85 parts |
| a silanol containing 25 cs. viscosity, polymethylsiloxane fluid containing approximately 5 mole percent trimethylsiloxy, 20 mole percent methylsiloxy, 75 mole percent dimethylsiloxy groups and approximately 0.5 weight % silanol | 15 parts |
| a 50 cs. viscosity trimethylsilyl terminated polydimethylsiloxane fluid | 25 parts |

A catalyst solution is prepared comprising the following (by weight):

| | |
|---|---|
| methyltrimethoxysilane | 1.5 parts |
| 1,3-dioxypropanetitanium-bis-ethyl-acetoacetate (catalyst) | 1.3 parts |
| 1,3,5-tris-trimethoxysilylpropylisocyanurate | 0.75 parts |

One hundred parts of the base compound is mixed together with 3.55 parts of the catalyst solution in the absence of air and atmospheric moisture. The anhydrous material is allowed to stand for three days and then cured and tested as described in Example 1.

Other modifications of the above examples provide self-bonding low modulus one-package RTV compositions within the scope of this invention.

For example, instead of the 25,000 and 105,000 cps. viscosity silanol-terminated polydimethylsiloxane, a 190,000 cps. viscosity silanol-terminated polydimethylsiloxane can be used. Preferably, with the dioxypropanetitanium-bis-ethylacetoacetate catalyst, there will be from 370 to 1,350 repeating units in the polydimethylsiloxane chain; and with the dioxypropanetitanium-bis-acetylacetonate, the silanol end-stopped polydimethylsiloxane chain will include an average of 300 to 5,260 repeating units. Instead of 1,3,5-tris-trimethoxysilylpropylisocyanurate, bis-1,3-trimethoxysilylpropylisocyanurate, or acetonitrile can be used, or the adhesion promoter can be dispensed with altogether. Instead of a titanium ester catalyst, the corresponding iron, germanium and zirconium analogs can be employed.

Obviously, other modifications and variations of the present invention are possible in the light of the above teachings. It is, therefore, to be understood that changes may be made in the particular embodiments of this invention which are within the full intended scope of the invention as defined by the appended claims.

I claim:

1. A fluid composition stable under substantially anhydrous conditions and curable to a self-bonding elastic solid in the presence of moisture which comprises:
   (a) 100 parts by weight of a silanol chain-stopped polydiorganosiloxane of the formula:

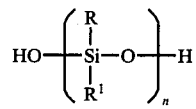

wherein R and $R^1$ are each, independently, organic radicals of up to 8 carbon atoms selected from hydrocarbyl, halohydrocarbyl and cyano lower alkyl and $n$ is an average number of from about 10 to 15,000;
   (b) from 0.01 to 5.0 parts by weight of a cross-linking silane of the formula:

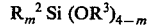

wherein $R^2$ and $R^3$ have the values defined for R and $R^1$ hereinabove and $m$ has a value of 0 to 3 and an average value based on the total amount of silane in the composition of 0 to 1.99; and
   (c) from 0.1 to 10 parts by weight of a silanol reactive organometallic ester compound of a metal other than silicon, said compound being a partially chelated ester of a lower aliphatic alcohol with a β-dicarbonyl compound or a partial hydrolyzate of such compounds which retain at least one hydrocarbonoxy radical or substituted by hydrocarbonoxy radical attached to the metal atom through M—O—C linkages wherein M is the metal, the weight ratio of components (c) to (b) always being at least 0.5 to 1.

2. A fluid composition stable under substantially anhydrous conditions and curable to a self-bonding elastic solid in the presence of moisture which comprises:
   (a) 100 parts by weight of a silanol chainstopped polydiorganosiloxane of the formula:

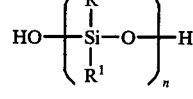

wherein R and $R^1$ are each, independently, organic radicals of up to 8 carbon atoms selected from hydrocarbyl, halohydrocarbyl and cyano lower alkyl and $n$ is an average number of from about 10 to 15,000;
   (b) from 0.01 to 5.0 parts by weight of a cross-linking silane of the formula:

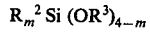

wherein R² and R³ have the values defined for R and R¹ hereinabove and m has a value of 0 to 3 and an average value based on the total amount of silane in the composition of 0 to 1.99; and (c) from 0.1 to 10 parts by weight of a silanol reactive organometallic ester compound of a metal other than silicon, said compound being a partially chelated ester of a lower aliphatic alcohol with a β-dicarbonyl compound or a partial hydrolyzate of such compounds which retain at least one hydrocarbonoxy radical or substituted hydrocarbonoxy radical attached to the metal atom through M—O—C linkages wherein M is the metal, the weight ratio of components (c) to (b) always being at least unity.

3. A composition as defined in claim 1 wherein the total of the number of moles of cross-linking silane (b) is less than the total of the number of moles of terminal silanol groups in polydiorganosiloxane component (a).

4. A composition as defined in claim 1 wherein the total of the number of moles of silanol reactive ester linkages in organometallic ester compound (c) is equal to or greater than the total of the number of moles of terminal silanol groups in polydiorganosiloxane component (a).

5. A composition as defined in claim 3 wherein the total of the number of moles of silanol reactive ester linkages in organometallic ester compound (c) is equal to or greater than the total of the number of moles of terminal silanol groups in polydiorganosiloxane component (a).

6. A composition as defined in claim 1 wherein the weight ratio of components (c) to (b) is from 0.5 to 1 to 50 to 1.

7. A composition as defined in claim 1 wherein the weight ratio of components (c) to (b) is from 0.5 to 1 to 10 to 1.

8. A composition as defined in claim 7 wherein the weight ratio of components (c) to (b) is from 0.5 to 1 to 5 to 1.

9. A composition as defined in claim 1 wherein the viscosity of component (a) is within the range of 2,000 to 1,000,000 cps. at 25° C.

10. A composition as defined in claim 9 wherein the viscosity of component (a) is within the range of 20,000 to 200,000 cps. at 25° C.

11. A composition as defined in claim 1, wherein, in component (a), at least 50% of the total number of R and R¹ groups are alkyl radicals and any remaining groups are aryl radicals.

12. A composition as defined in claim 11 wherein the alkyl radicals are methyl radicals and any remaining aryl radicals are phenyl radicals.

13. A composition as defined in claim 1 wherein, in component (b), at least 50% of the total number of R² and R³ groups are alkyl radicals and any remaining groups are aryl radicals and m is 1.

14. A composition as defined in claim 13 wherein the alkyl radicals are methyl radicals and any remaining aryl radicals are phenyl radicals.

15. A composition as defined in claim 1 wherein, in said organometallic ester component (c), the metal M is selected from lead, tin, zirconium, antimony, iron, cadmium, barium, calcium, titanium, bismuth, manganese, zinc, chromium, cobalt, nickel, aluminum, gallium or germanium.

16. A composition as defined in claim 15 wherein, in said organometallic ester component (c), the metal M is titanium.

17. A fluid composition stable under substantially anhydrous conditions and chain-stopped to a self-bonding elastic solid in the presence of moisture which comprises:

(a) 100 parts by weight of a silanol chainstopped polydiorganosiloxane of the formula:

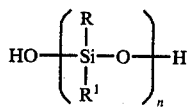

wherein R and R¹ are each, independently, organic radicals of up to 8 carbon atoms selected from hydrocarbyl, halohydrocarbyl and cyano lower alkyl and n is an average number of from 10 to 15,000;

(b) from 0.01 to 5.0 parts by weight of a cross-linking silane of the formula:

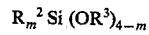

$R_m^2 Si(OR^3)_{4-m}$ wherein R² and R³ have the values defined for R and R¹ hereinabove and m has a value of 0 to 3 and an average value based on the total amount of silane in the composition of 0 to 1.99; and (c) from 0.1 to 10 parts by weight of a titanium chelate catalyst of the formula:

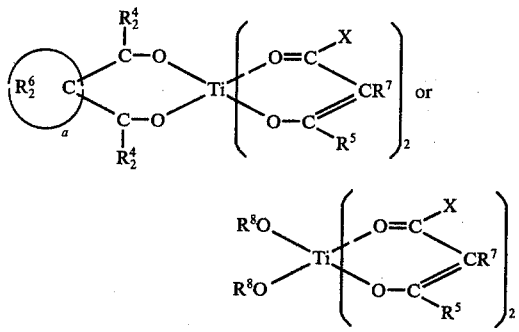

wherein R⁴ is hydrogen, or an organic radical of up to 8 carbon atoms selected from hydrocarbyl, halohydrocarbyl, or carboxyalkyl; R⁵ is a radical of up to 8 carbon atoms selected from hydrocarbyl, halohydrocarbyl and cyano lower alkyl; R⁶ is selected from same group as R⁴ and in addition from halo, cyano, nitro, carboxy ester, or acyl and hydrocarbyl substituted by halo, cyano, nitro, carboxy ester and acyl, the total number of carbon atoms in the R⁴ and in the R⁶ substituted alkanedioxy radical being not more than about 18; R⁷ is selected from hydrogen or an organic radical of up to 8 carbon atoms selected from hydrocarbyl, halohydrocarbyl, or acyl and, when taken together with R⁵ forms together with the carbon atoms to which they are attached a cyclic hydrocarbon substituent of up to about 12 carbon atoms or such a substituent substituted with one or more of a chloro, nitro, acyl, cyano or carboxy ester substituents; X is a radical of up to 20 carbon atoms selected from hydrocarbyl, halohydrocarbyl, cyanoalkyl, alkoxy, haloalkoxy, cyanoalkoxy, amino or ether and polyether groups of the formula —$(C_qH_{2q}O)_vR$ where $q$ is from 2 to 4, $v$ is from 1 to 20 and R is an organic radical of up to 8 carbon atoms selected from hydrocarbyl, halohydrocarbyl or cyano lower alkyl, $a$ is 0 or an integer of up to 8 and, when $a$ is 0, the $>C-R_2^4$ groups are bonded to each other in a cyclic fashion, and $R^8$ is a radical of up to 8 carbon atoms selected from hydrocarbyl, halohydrocarbyl or cyano lower alkyl, the weight ratio of components (c) to (b) always being at least 0.5 to 1.

18. A fluid composition stable under substantially anhydrous conditions and curable to a self-bonding elastic solid in the presence of moisture which comprises:

(a) 100 parts by weight of a silanol chain-stopped polydiorganosiloxane of the formula:

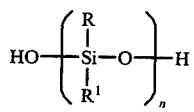

wherein R and $R^1$ are each, independently, organic radicals of up to 8 carbon atoms selected from hydrocarbyl, halohydrocarbyl and cyano lower alkyl and $n$ is an average number of from about 10 to 15,000;

(b) from 0.01 to 5.0 parts by weight of a cross-linking silane of the formula:

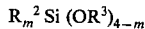

wherein $R^2$ and $R^3$ have the values defined for R and $R^1$ hereinabove and $m$ has a value of 0 to 3 and an average value based on the total amount of silane in the composition of 0 to 1.99; and (c) from 0.1 to 10 parts by weight of a titanium chelate catalyst of the formula:

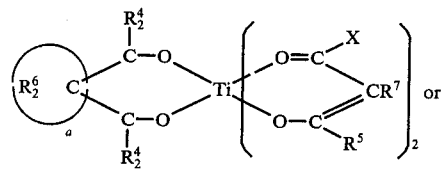

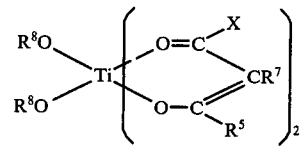

wherein $R^4$ is hydrogen, or an organic radical of up to 8 carbon atoms selected from hydrocarbyl, halohydrocarbyl, or carboxyalkyl; $R^5$ is a radical of up to 8 carbon atoms selected from hydrocarbyl, halohydrocarbyl and cyano lower alkyl; $R^6$ is selected from same group as $R^4$ and in addition from halo, cyano, nitro, carboxy ester, or acyl and hydrocarbyl substituted by halo, cyano, nitro, carboxy ester and acyl, the total number of carbon atoms in the $R^4$ and in the $R^6$ substituted alkanedioxy radical being not more than about 18; $R^7$ is selected from hydrogen or an organic radical of up to 8 carbon atoms selected from hydrocarbyl, halohydrocarbyl, or acyl and, when taken together with $R^5$ forms together with the carbon atoms to which they are attached a cyclic hydrocarbon substituent of up to about 12 carbon atoms or such a substituent substituted with one or more of a chloro, nitro, acyl, cyano or carboxy ester substituents; X is a radical of up to 20 carbon atoms selected from hydrocarbyl, halohydrocarbyl, cyanoalkyl, alkoxy, haloalkoxy, cyanoalkoxy, amino or ether and polyether groups of the formula —$(C_qH_{2q}O)_vR$ where $q$ is from 2 to 4, $v$ is from 1 to 20 and R is an organic radical of up to 8 carbon atoms selected from hydrocarbyl, halohydrocarbyl or cyano lower alkyl, $a$ is 0 or an integer of up to 8 and, when $a$ is 0, the $>C-R_2^4$ groups are bonded to each other in a cyclic fashion, and $R^8$ is a radical of up to 8 carbon atoms selected from hydrocarbyl, halohydrocarbyl or cyano lower alkyl, the weight ratio of components (c) to (b) always being at least unity.

19. A composition as defined in claim 17 wherein said component (c) is of the formula:

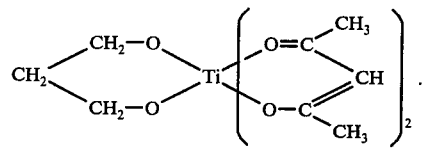

20. A composition as defined in claim 17 wherein, in component (b), $R^2$ and $R^3$ are alkyl and, in component (c), $R^4$ and $R^6$ are hydrogen and $R^5$ is alkyl.

21. A composition as defined in claim 17 wherein, in component (b), $R^2$ and $R^3$ are methyl, and, in component (c) $R^5$ is methyl, X is —$OC_{15}H_{31}$, and $a$ is 1.

22. A composition as defined in claim 21 wherein, in component (c), $R^4$ and $R^6$ are each hydrogen.

23. A composition as defined in claim 20 wherein, in component (b), $R^2$ and $R^3$ are methyl and, in component (c), $R^5$ and X are methyl and $R^4$ and $R^6$ are hydrogen.

24. A composition as defined in claim 17 wherein component (a) is

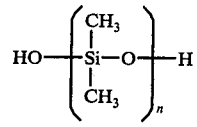

wherein $n$ is from about 300 to about 5,260; component (b) is $(CH_3)Si(OCH_3)_3$; and component (c) is

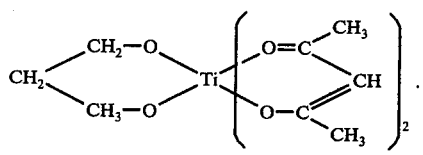

25. A composition as defined in claim 17 wherein component (a) is

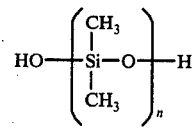

wherein n is from about 370 to about 1,350; component (b) is

CH₃Si(OCH₃)₃;

and
component (c) is

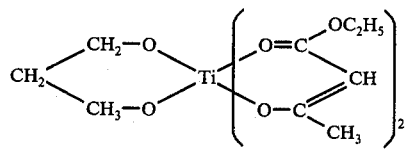

26. A composition as defined in claim 17 wherein, in component (c), $a$ is 0 or 1 and $R^4$ and $R^6$ are hydrogen or methyl.

27. A composition as defined in claim 1 wherein from about 10 to about 100 parts by weight of a filler per 100 parts of the silanol chain-stopped polydiorganosiloxane is also included.

28. A composition as defined in claim 27 wherein said filler is calcium carbonate or a mixture of fumed silica and calcium carbonate.

29. A composition as defined in claim 1 wherein from 0.2 to 2 parts of an adhesion promoter per 100 parts of the silanol chain-stopped polydiorganosiloxane is also included.

30. A composition as defined in claim 29 wherein said adhesion promoter is of the formula:

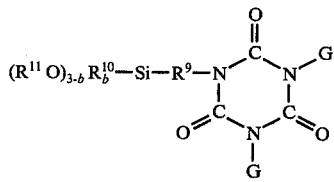

wherein G is the same as $R^{10}$, hereinafter defined, a $(R^{11}O)_{3-b}—R_b^{10}—Si—R^9$ radical, styryl, vinyl, allyl, chloroallyl or cyclohexenyl; $R^9$ is a divalent radical selected from alkylenearylene, alkylene, cycloxyene and halosubstituted such divalent radicals; $R^{10}$ is a radical of up to 8 carbon atoms selected from hydrocarbyl or halohydrocarbyl, and $R^{11}$ is a radical of the type defined for $R^{10}$ and also cyano lower alkyl; and $b$ is 0 to 3.

31. A composition as defined in claim 29 wherein said adhesion promoter is 1,3,5-tris-trimethoxysilyl-propylisocyanurate.

32. A composition as defined in claim 29 wherein said adhesion promoter is bis-1,3-trimethoxysilyl-propylisocyanurate.

33. A composition as defined in claim 1 wherein from about 0.3 to about 20 parts by weight of a polydiorganosiloxane viscosity depressant per 100 parts of the silanol chain-stopped polydiorganosiloxane component (a) is also included.

34. A composition as defined in claim 33 wherein said viscosity depressant is of the formula:

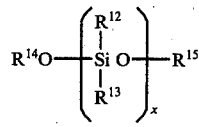

wherein $R^{12}$ and $R^{13}$ are each organic radicals of up to 8 carbon atoms selected from hydrocarbyl, halohydrocarbyl and cyano lower alkyl, $R^{14}$ and $R^{15}$ are, independently, hydrogen or radicals as defined for $R^{12}$ and $R^{13}$ and $x$ has a value of from 2 to 46.

35. A composition as defined in claim 34 wherein at least 50% of the total number of $R^{12}$ and $R^{13}$ groups are alkyl radicals and any remaining such groups are aryl radicals.

36. A composition as defined in claim 35 wherein the alkyl radicals are methyl radicals and any remaining aryl radicals are phenyl radicals.

37. A composition as defined in claim 34 wherein in the viscosity depressant, $R^{14}$ and $R^{15}$ are hydrogen or methyl, $R^{12}$ and $R^{13}$ are methyl or methyl and phenyl in a ratio of about 70:30, and $x$ is an integer of from 3 to 50.

38. A method of preparing a rubbery material which comprises preparing a composition in accordance with claim 1 under substantially anhydrous conditions and thereafter exposing the composition to moisture until it cures to a rubbery material.

* * * * *

UNITED STATES PATENT AND TRADEMARK OFFICE
CERTIFICATE OF CORRECTION

PATENT NO. : 4,100,129
DATED : July 11, 1978
INVENTOR(S) : Melvin D. Beers

It is certified that error appears in the above-identified patent and that said Letters Patent are hereby corrected as shown below:

Claim 1, column 16, line 42, "by" should be deleted;

Claim 17, column 18, line 5, "chain-stopped" should be deleted and --curable--inserted in its place.

Signed and Sealed this

Twenty-seventh Day of March 1979

[SEAL]

Attest:

RUTH C. MASON
*Attesting Officer*

DONALD W. BANNER
*Commissioner of Patents and Trademarks*